United States Patent [19]

Sowers

[11] 4,385,677
[45] May 31, 1983

[54] UNIVERSAL JOINT HOUSING

[75] Inventor: Eugene E. Sowers, Toledo, Ohio

[73] Assignee: Dana Corporation, Toledo, Ohio

[21] Appl. No.: 241,966

[22] Filed: Mar. 9, 1981

[51] Int. Cl.³ ............................ F16D 3/10; F16J 15/16
[52] U.S. Cl. .................................... 180/254; 464/171; 464/173
[58] Field of Search ............... 180/254, 258, 259, 263, 180/256, 257, 255; 464/171, 177, 178, 173

[56] References Cited

U.S. PATENT DOCUMENTS

| | | | |
|---|---|---|---|
| 958,023 | 5/1910 | Spicer | 464/171 |
| 1,212,395 | 1/1917 | Perkins | 464/171 X |
| 1,274,840 | 8/1918 | Bangs | 180/254 |
| 1,447,572 | 3/1923 | Ross | 180/254 |
| 1,543,575 | 6/1925 | Kishline | 464/171 |
| 2,165,052 | 7/1939 | Hering | 285/111 |
| 2,333,911 | 11/1943 | Alden | 180/254 X |
| 2,775,307 | 12/1956 | Hill | 180/257 |
| 3,075,370 | 1/1963 | Kings | 464/171 |
| 3,255,839 | 6/1966 | Goldman | 180/254 |
| 3,583,244 | 6/1971 | Teinert | 464/173 |
| 4,091,689 | 5/1978 | Huffman | 180/255 |

Primary Examiner—John A. Pekar
Attorney, Agent, or Firm—Robert M. Leonardi; Norb A. Heban

[57] ABSTRACT

A housing assembly is disclosed having coacting first and second cover members enclosing a universal joint which drivingly connects drive and driven shafts of a steering drive axle. Each cover member has an inner spherical portion and an outer end portion. The spherical portions overlie and fit within each other while the end portion of one cover member is fixed to a wheel spindle and the end portion of the other cover member is resiliently connected to an axle housing. The resilient connection permits the cover member to float relative to the axle housing during steering to accomodate for runout between the wheel spindle and axle housing axes thus overcoming any tendency for the cover members to bind or become wedged with respect to each other.

6 Claims, 4 Drawing Figures

UNIVERSAL JOINT HOUSING

BACKGROUND OF THE INVENTION

The present invention relates to steering drive axle devices in general and is particularly directed to a universal joint sealing arrangement for these devices.

Conventional steering drive axles comprise a non-rotatable axle housing and a cooperating wheel mounting spindle. Opposed yokes are associated with the axle housing and spindle with generally vertically aligned trunnions provided to connect the yokes and permit the spindle to swing a limited amount in either direction about the common axis of the trunnions during steering of the vehicle. An enlarged space is provided within the opposed yokes to receive a universal joint which transmits drive between the drive and driven shafts of the axle assembly. The drive shaft extends through the axle housing and the driven shaft extends through the spindle and is connected to the vehicle wheel.

Sealing arrangements are required to protect the universal joint connection used in such devices. The sealing arrangement serves to keep out dirt and moisture and prevent escape of lubricant. Prior arrangements consist of either a single flexible boot or a housing having coacting rigid cover members for enclosing the universal joint. A disadvantage in the former case is that the flexible boot is exposed and therefore susceptable to physical damage and deterioration. A disadvantage in the latter case is that the cover ends are fixed and because of this there is a tendency for the rigid cover members to bind during swinging of the spindle. The bind occurs because the fixed center or pivot points of the opposed cover ends have a tendency to want to move off-center when the cover housing and spindle axes become displaced slightly during pivotal movement about the trunnion axis. Thus, the freedom of movement is restrained to a degree each time the steering operation takes place. This constant occurence of this binding action during steering operations could result in premature failure of the housing and possible damage to the universal joint components. What further complicates matters is that it is a known fact that pivot points in such designs are normally not located directly on-center just because of the normal tolerance build-up that exists when assembling the parts.

While the above sealing arrangements operate in a satisfactory manner when initially installed, each has limitations which make them undesirable after a period of constant operation.

SUMMARY OF THE INVENTION

The present invention is a housing for enclosing a universal joint used to connect drive and driven shafts of a steering drive axle assembly. The housing comprises first and second cover members having coacting inner portions surrounding the universal joint and outer end portions. One of the cover end portions is fixed to a supporting structure and the other is resiliently connected to a supporting structure so that it can flex about a fixed point to permit the cover members to move relative to each other. The freedom of movement accomplished by resiliently supporting one of the cover ends will tend to reduce binding during steering and thereby increase the life of the drive axle assembly.

DESCRIPTION OF THE PREFERRED EMBODIMENT

Figure 1:
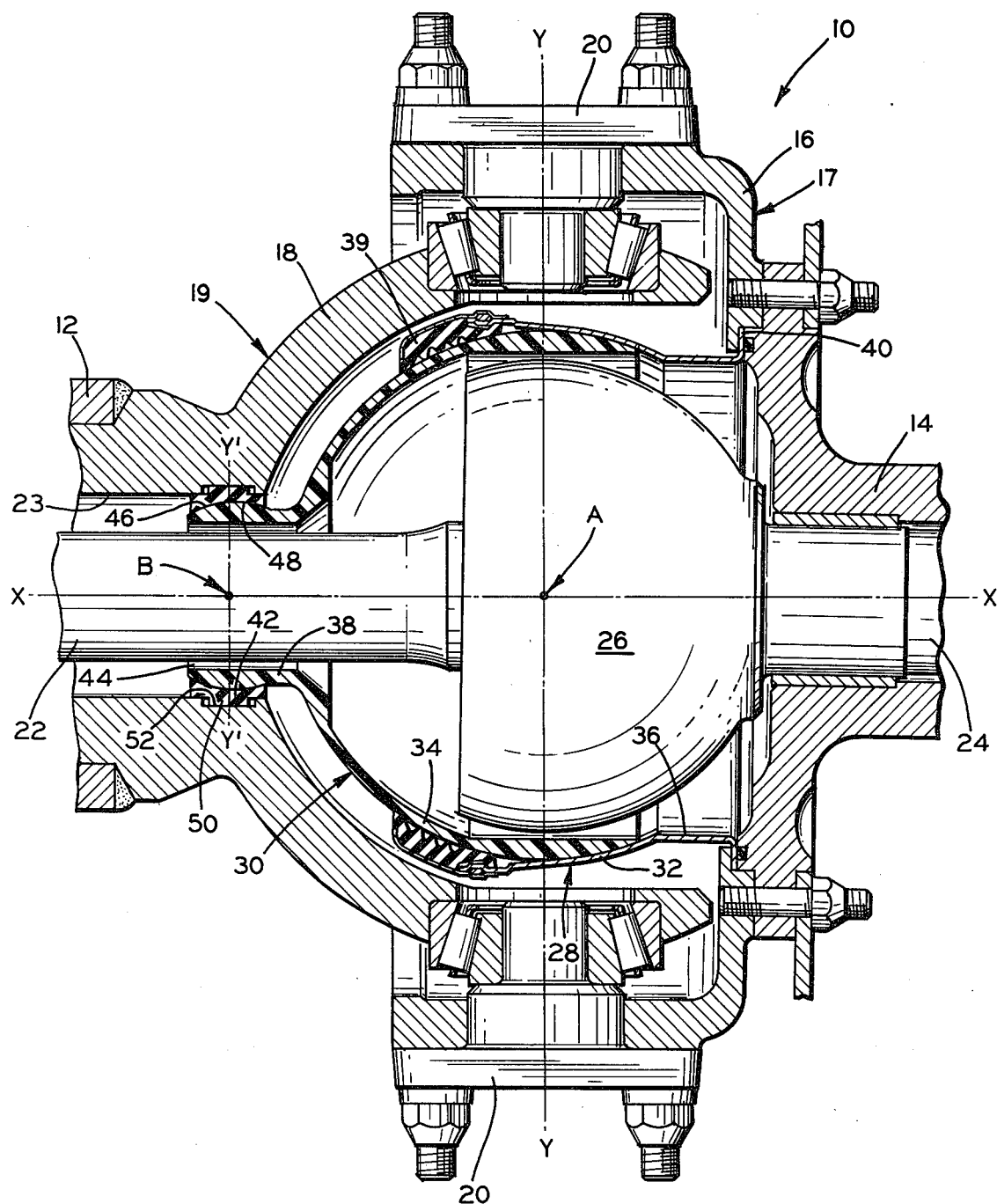
FIG. 1 is a vertical partial sectional view of a steering drive axle assembly embodying the present invention.

Referring to FIG. 1 of the drawings, a steering drive axle is shown generally at 10. The steering drive axle 10 comprises a non-rotatable tubular axle housing 12 and an axially spaced wheel supporting spindle 14. A yoke 16 is secured to wheel spindle 14 and constitutes a wheel housing assembly 17. A yoke 18 is secured to axle housing 12 constituting an axle housing assembly 19. Yokes 16 and 18 have opposed overlying upper and lower arms provided with generally vertically aligned trunnions 20 for pivotal attachment of spindle yoke 16 to axle housing yoke 18. This pivotal attachment permits the wheel housing assembly 17 to swing relatively to the axle housing assembly 19 a limited amount in either direction about the common axis Y—Y of trunnions 20 during steering of the vehicle. An axle drive shaft 22 extends through axle housing 12 and a central bore 23 provided in axle yoke 18. A wheel driven shaft 24 extends through and is suitably piloted in a central bore formed in wheel spindle 14.

A pivotal drive connection is provided for steering drive axle 10 so that power can be transmitted from axle drive shaft 22, which is connected to conventional differential gearing (not shown), to wheel driven shaft 24 which is connected to a wheel hub (not shown) rotatably supported on wheel spindle 14. The pivotal drive connection is a universal joint 26 located in the enlarged space provided within the yokes 16 and 18. Universal joint 26 is positioned so that its center of rotation "A" coincides with trunnion axis Y—Y. Thus, universal joint 26 connects drive and driven shafts 22 and 24 so that driven shaft 24 may be rotated by drive shaft 22 when relative angular movement occurs during the steering operation.

Because of the operation of universal joint 26, it is necessary that the pivotal driving connection be enclosed in order to insure the retention of lubricant and exclusion of dirt and grit during operation. In a preferred embodiment, a housing is provided for enclosing universal joint 26. The housing comprises a first outer cover member 28 and a coacting second inner cover member 30. Each cover member 28 and 30 has an inner spherical portions 32 and 34 and outer end portions 36 and 38 respectively. Spherical portions 32 and 34 are formed about an axis at the center "A" of universal joint 26. Outer spherical portion 32 is slightly larger than outer spherical portion 34 to provide slight clearance between the mating inner and outer surfaces so that relative movement can occur between the surfaces when wheel spindle 14 swings about trunnion axis Y—Y. Spherical portions 32 and 34 open toward one another and each partially covers universal joint 26 while their respective outer end portions 36 and 38 extend in opposite directions from one another.

Mounted on the free end of outer cover spherical portion 32 is an annular seal 39. Seal 39 is conventional in nature and functions to effectively wipe along the outer surface of inner cover spherical surface 34 during relative pivotal movement of outer cover 28 about point "A."

Outer end portions 36 and 38 serve as the means for connecting cover members 28 and 30 to the supporting wheel and axle housing assemblies 17 and 19 respectively. To achieve the desired results, one of the cover member end portions is fixed with respect to its supporting assembly and the other is resiliently mounted relative to the other supporting assembly. In a preferred embodiment, outer cover 28 has its end portion 36 fixed to the wheel supporting assembly 17 so as to be movable therewith while end portion 38 of inner cover 30 is resiliently connected to the axle housing assembly 19.

In the preferred embodiment, the fixed connection for outer cover 28 is accomplished by forming a radially outwardly extending flange 40 on the free end of portion 36. Flange 40 is positioned and clamped between mating radial faces on wheel spindle 14 and wheel yoke 16.

The resilient connection for inner cover 30 in the preferred embodiment is accomplished by positioning the free end of inner cover portion 38 within the axle housing yoke bore 23 and providing an annular rubber ring 42 between the outer surface of end portion 38 and inner surface of yoke bore 23. The resiliency of rubber ring 42 is sufficient to permit cover end portion 38 to move or float relative to axle housing assembly 19 about this connection. The freedom of movement provided by ring 42 will accomodate and overcome any tendency of inner cover 30 to bind or become wedged with respect to outer cover 28 during steering operations. End portion 38 surrounds axle drive shaft 22 and has its internal surface spaced from the outer surface of shaft 22 so as to provide a clearance 44. An external spherical or domed surface 46 constructed on end portion 38, engages a complimentary inner spherical or domed surface 48 on the interior of rubber ring 42. The rubber ring 42 outer surface 48 has a raised annular rib 50 fitting into an annular groove 52 formed in yoke bore 23 to retain it in place with respect to axle housing assembly 19.

As seen in FIG. 1, a plane Y—Y normal to the longitudinal axis X—X of axle shaft 22, passing through the center of coacting domed surfaces 46 and 48, establishes a point "B" on axle shaft axis X—X about which inner cover end portion 38 can flex within yoke bore 23.

If desired, means can be provided to accomodate further movement of end portion 38 relative to point "B". For this purpose the axial length of bore groove 52 may be increased so as to be greater than the axial length of ring rib 50. This provides additional space for limited axial sliding of ring rib 50 within bore groove 52 and thereby relative to axle housing assembly 19 (as shown in the embodiment of FIG. 1).

Figure 2:
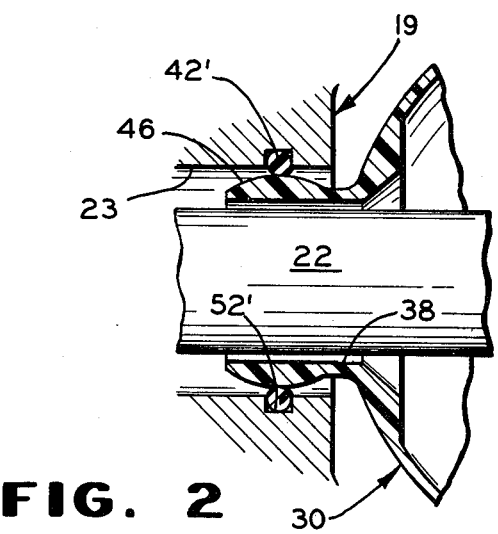
FIGS. 2 and 3 show alternate resilient mountings for one of the cover members.
Figure 3:
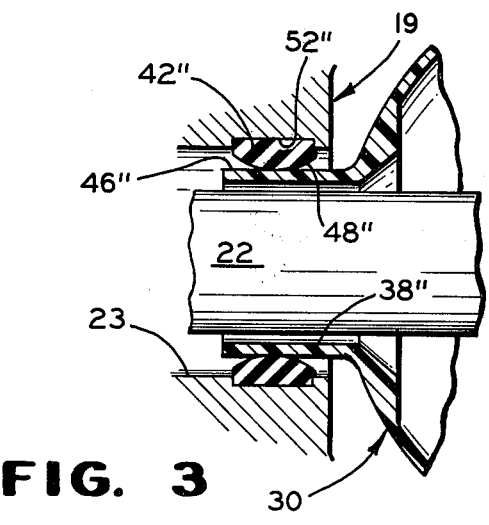

Alternate mounting arrangements are illustrated in FIGS. 2 and 3 for resiliently connecting the outer end of inner cover 30 within axle housing assembly 19. In FIG. 2 end portion 38 has a domed surface 46 similar to that of FIG. 1. The difference in this design is that the resilient member is an O-Ring 42' which fits into an annular groove 52' formed in the bore 23 of axle housing assembly 19.

In FIG. 3, the resilient connection is accomplished by providing a tubular end portion 38" on inner cover 30 forming a cylindrical external surface 46". Resilient member 42" has an internal domed surface 48" engaging the cylindrical surface 46". Ring 42" is seated in an annular groove 52" formed in the bore 23 of axle housing assembly 19.

Figure 4:
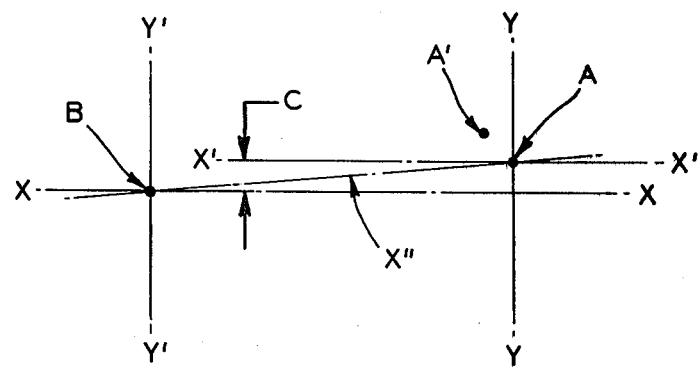
FIG. 4 is a diagramatic view showing a typical spindle runout relative to the axle housing with the universal joint cover members of the present invention.

Referring to FIG. 4, a diagramatic view is included to show an example of a typical application where spindle runout occurs relative to the axle housing with cover members of the present invention. Here axis X—X of axle housing 12 is fixed with respect to inner cover 30 while axis X'—X' is fixed with respect to outer cover 28. Outer cover axis X'—X' is shown offset a distance "C" from inner cover axis X—X due to runout of the spindle axis of spindle yoke 16 and outer cover 28. The displaced axis of inner cover 30 is shown at X". Axis X" is angularly disposed and intersects points "A" and "B" upon runout of spindle axis X'—X'. Mounting of inner cover end portion 38 within rubber ring 42 enables end portion 38 to flex or float about point "B" within axle housing 12. Flexing or floating of inner cover 30 about point "B" results in sufficient freedom of movement at this point to eliminate any binding tendency between the covers during steering. This serves to minimize the axle housing to spindle yoke runout effect on Seal 39. It is also possible that the point "A" shown on axis X'—X' can shift to a different location, e.g. as illustrated by A' and still achieve the desired results. Thus, the provision of a resilient connection for one of the cover ends allows such displacement to occur without the binding affect that normally results if both ends were fixed.

It is obvious that other types of resilient connections may be used in place of those shown, e.g., it may be possible to construct the cover end 38 of resilient material and it directly connecting to axle housing assembly 19. It is also possible that the resilient connection may be designed on the cover end 36 and the rigid connection provided at the opposite cover end 38. The resilient connection is an important feature in that it allows one of the cover members to float relative to its supporting housing.

As constructed, the use of a rubber ring to form the floating connection at the cover end permits this end to constantly seek its own position, thereby overcoming any tendency to bind as the covers move relative to each other. Also, with this design it is not required to maintain close tolerances on the operating parts in order to try to maintain the cover pivot points as close to center as possible as in the past. In addition, this design is capable of allowing the resilient connection, due to its floating nature, to accomodate numerous directions of movement that may occur at this point during steering, e.g., longitudinal, radial, rotational, and axial, either separately or in combination.

From the foregoing description, it is apparent that the advantages of the present invention result from flexibly attaching one of the cover ends and rigidly connecting the other. This relationship will satisfactorily overcome any dimensional tolerances, thermal conditions and normal deflection that occurs in conventional steering drive axle assembly that normally results in binding and subsequent failure. These are conditions present in conventional systems due to the inability to design an ideal assembly and must be contended with.

Having thus described preferred embodiments of the invention, it should be understood that the invention is not to be limited to the specific construction and arrangements shown and described. It will be apparent to those skilled in the art that modifications or alterations may be made without departing from the spirit and scope of the invention as set forth in the appended claims.

I claim:

1. In a steering drive axle having an axle housing assembly, a wheel spindle assembly, trunnion means mounting said wheel spindle assembly for turning movement on said axle housing assembly, a drive shaft extending through said axle housing assembly, a driven shaft extending through said wheel spindle assembly, and a universal joint connecting said drive and driven shafts; the improvement comprising:

a housing for enclosing said universal joint, said housing comprising coacting first and second cover members, said first cover member having an inner portion surrounding said universal joint and an outer end connected to said wheel spindle assembly, said second cover member having an inner portion and an outer end, said inner portion surrounding said universal joint and slidably engaging said first cover inner portion, and means resiliently connecting said second cover outer end to said axle housing assembly, said resilient connection comprises an annular member interposed between said second cover outer end and said axle housing assembly permitting said second cover member to move relative to said first cover member during turning of said wheel spindle assembly on said cover assembly while floating about said flexible connection.

2. A steering drive axle according to claim 1 wherein said axle housing assembly further comprises an annular groove, said annular member further comprises a rib engaging said groove to retain said annular member in said axle housing assembly.

3. A steering drive axle according to claim 2 wherein said annular groove and said annular rib further comprise means permitting relative axial movement between said axle housing assembly and said annular member.

4. A steering drive axle according to claim 3 wherein said second cover outer end further comprises a domed surface, and said annular member further comprises a complimentary surface encircling and engaging said end portion domed surface.

5. A steering drive axle according to claim 1 wherein said annular resilient member comprises an O-ring interposed between said second cover outer end and said axle housing assembly.

6. A steering drive axle according to claim 1 wherein second cover outer end further comprises a tubular portion having a cylindrical outer surface, and said annular resilient member further comprises a domed inner surface encircling and engaging said flat outer surface.

* * * * *